United States Patent
Horng et al.

(10) Patent No.: US 12,372,635 B2
(45) Date of Patent: Jul. 29, 2025

(54) SELF-INJECTION-LOCKING MONOPULSE RADAR

(71) Applicant: NATIONAL SUN YAT-SEN UNIVERSITY, Kaohsiung (TW)

(72) Inventors: Tzyy-Sheng Horng, Kaohsiung (TW); Wei-Chih Su, Kaohsiung (TW); Xuan-Xin Wu, Kaohsiung (TW); Mu-Cyun Tang, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 380 days.

(21) Appl. No.: 17/971,697

(22) Filed: Oct. 24, 2022

(65) Prior Publication Data

US 2023/0228864 A1    Jul. 20, 2023

(30) Foreign Application Priority Data

Jan. 20, 2022 (TW) .................................. 111102458

(51) Int. Cl.
*G01S 13/524* (2006.01)
*G01S 7/03* (2006.01)
(Continued)

(52) U.S. Cl.
CPC .......... *G01S 13/4409* (2013.01); *G01S 7/032* (2013.01); *G01S 7/2921* (2013.01); *G01S 7/415* (2013.01); *G01S 13/524* (2013.01); *G01S 13/56* (2013.01)

(58) Field of Classification Search
CPC ...... G01S 13/524; G01S 13/56; G01S 7/2921; G01S 7/415; G01S 12/4409; G01S 7/032
See application file for complete search history.

(56) References Cited

U.S. PATENT DOCUMENTS 5,619,206 A * 4/1997 Cole, Jr. ............ G01S 13/4454
                                                          342/149
10,763,872 B1 * 9/2020 Wang .................... G01S 13/88
(Continued)

FOREIGN PATENT DOCUMENTS

CN  110547778 A  12/2019
TW  201901181 A   1/2019
(Continued)

OTHER PUBLICATIONS

Wei-Chih Su et al., Hybrid Continuous-Wave and Self-Injection-Locking Monopulse Radar for Posture and Fall Detection, IEEE Transactions on Microwave Theory and Techniques, Jan. 26, 2022.
(Continued)

*Primary Examiner* — Jack W Keith
*Assistant Examiner* — Clayton Paul Ridder
(74) *Attorney, Agent, or Firm* — Demian K. Jackson; Jackson IPG PLLC

(57) ABSTRACT

A SIL monopulse radar includes a self-injection-locking oscillator (SILO), a transmit antenna, two receive antennas, a hybrid coupler, a first demodulator, a second demodulator and a processor. The transmit antenna transmits the oscillation signal of the SILO to object. The two receive antennas receive a reflected signal from the object as a first echo signal and a second echo signal. The hybrid coupler outputs a difference signal and a sum signal. The difference signal is injected into the SILO. The first demodulator frequency-demodulates the oscillation signal to produce a first demodulated signal. The second demodulator phase-demodulates the sum signal by using the oscillation signal as a reference signal to produce a second demodulated signal. The processor processes the first and second demodulated signals to produce a monopulse ratio signal. The SIL monopulse radar
(Continued)

can identify the posture and motion of a human body by analyzing the monopulse ratio signal.

12 Claims, 8 Drawing Sheets

(51) Int. Cl.
*G01S 7/292* (2006.01)
*G01S 7/41* (2006.01)
*G01S 13/44* (2006.01)
*G01S 13/56* (2006.01)

(56) References Cited

U.S. PATENT DOCUMENTS

| | | | |
|---|---|---|---|
| 2008/0077015 A1* | 3/2008 | Boric-Lubecke | G01S 13/888 600/453 |
| 2020/0295770 A1 | 9/2020 | Wang et al. | |
| 2021/0109208 A1 | 4/2021 | Horng et al. | |
| 2023/0337928 A1* | 10/2023 | Harel | G01S 7/415 |

FOREIGN PATENT DOCUMENTS

| | | |
|---|---|---|
| TW | 202020475 A | 6/2020 |
| TW | 741875 B | 10/2021 |

OTHER PUBLICATIONS

Taiwanese Office Action mailed Sep. 30, 2022 for Taiwanese Patent Application No. 111102458, 3 pages.

* cited by examiner

SELF-INJECTION-LOCKING MONOPULSE RADAR

FIELD OF THE INVENTION

This invention generally relates to a monopulse radar, and more particularly to a self-injection-locking (SIL) monopulse radar.

BACKGROUND OF THE INVENTION

The monopulse radar is well known for tracking a fast-moving object, such as an aircraft or a missile using the sum and difference signals of two echoes received by two receive antennas. However, the difference signal of the conventional monopulse radar is usually too weak to be Doppler-detected for capturing tiny chest movement due to cardiopulmonary activity. Therefore, the application of the conventional monopulse radar in human sensing is still limited in practice.

SUMMARY

The present invention uses self-injection-locking technology to enhance the sensitivity of extracting the Doppler phase shift from the difference signal and hence uses two different demodulators to demodulate the Doppler phase-shifted sum and difference signals, respectively, in a monopulse radar. Accordingly, the SIL monopulse radar of the present invention can sense small-scale physiological movement of a person and thereby identify his or her posture and motions.

One aspect of the present invention provides a SIL monopulse radar which includes a self-injection-locking oscillator (SILO), a transmit antenna, two receive antennas, a hybrid coupler, a first demodulator, a second demodulator and a processor. The SILO is provided to generate an oscillation signal. The transmit antenna is coupled to the SILO to receive the oscillation signal and provided to transmit the oscillation signal to an object as a transmitted signal. The two receive antennas are provided to receive a reflected signal reflected from the object as a first echo signal and a second echo signal, respectively. The hybrid coupler is electrically connected to the two receive antennas and the SILO to receive the first and second echo signals and is provided to output a difference signal and a sum signal. The difference signal is injected into the SILO to achieve a SIL state. The first demodulator is coupled to the SILO to receive the oscillation signal and is provided to frequency-demodulate the oscillation signal to produce a first demodulated signal. The second demodulator is coupled to the hybrid coupler and the SILO to receive the sum signal and the oscillation signal and is provided to phase-demodulate the sum signal by using the oscillation signal as a reference signal to produce a second demodulated signal. The processor is electrically connected to the first and second demodulators to receive the first and second demodulated signals and provided to process the first and second demodulated signals to produce a monopulse ratio signal.

Compared to the conventional monopulse radar, the SIL monopulse radar of the present invention is more sensitive to extract the Doppler phase shift of the chest induced by cardiopulmonary activity from both the sum and difference signals. By doing so, it can produce the monopulse ratio signal as a result of demodulating the sum and difference signals to determine the angle of the direction towards the chest of the human body for the purpose of classifying postures or motions.

DETAILED DESCRIPTION OF THE INVENTION

Figure 1:
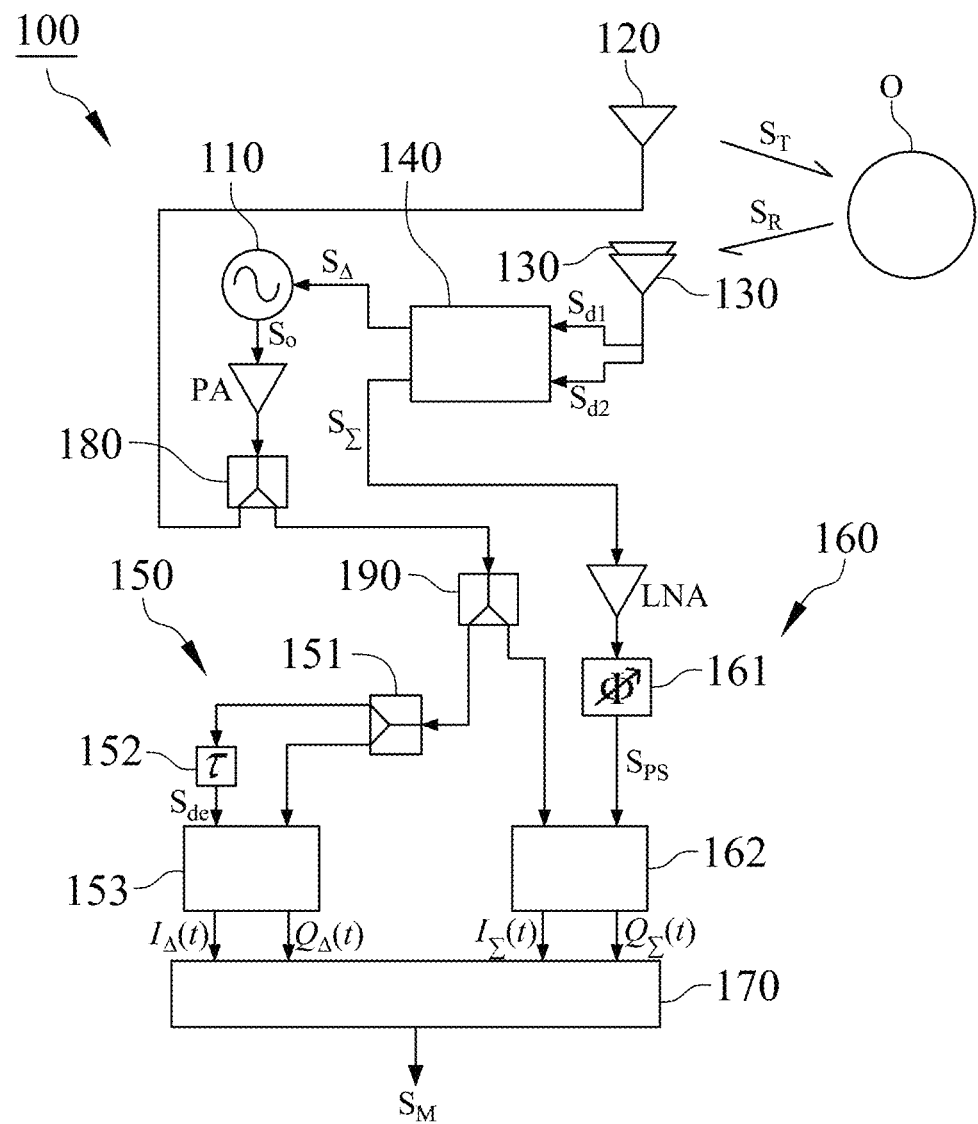
FIG. 1 is a block diagram illustrating a SIL monopulse radar in accordance with one embodiment of the present invention.

FIG. 1 is a block diagram showing a SIL monopulse radar 100 of one embodiment of the present invention. The SIL monopulse radar 100 includes a self-injection-locking oscillator (SILO) 110, a transmit antenna 120, two receive antennas 130, a hybrid coupler 140, a first demodulator 150, a second demodulator 160, a processor 170, a first power splitter 180 and a second power splitter 190.

With reference to FIG. 1, the SILO 110 is a voltage-controlled oscillator that receives a control voltage (not shown) to generate an oscillation signal $S_O$ at a specific frequency. The first power splitter 180 is electrically connected to the SILO 110 via a power amplifier PA, receives the oscillation signal $S_O$ from the power amplifier PA and divides it into two parts. The transmit antenna 120 is electrically connected to the first power splitter 180 to receive one part of the oscillation signal $S_O$, and transmits the oscillation signal $S_O$ to an object O as a transmitted signal $S_T$. A reflected signal $S_R$ is reflected from the object O.

The two receive antennas 130 receive the reflected signal $S_R$ from the object O as a first echo signal $S_{d1}$ and a second echo signal $S_{d2}$, respectively. The first echo signal $S_{d1}$ and the second echo signal $S_{d2}$ both have a Doppler phase shift caused by the movement of the object O as a result of the Doppler effect. The hybrid coupler 140 is electrically connected to the two receive antennas 130 and the SILO 110, receives the first echo signal $S_{d1}$ and the second echo signal $S_{d2}$ and outputs a difference signal $S_\Delta$ and a sum signal $S_\Sigma$. In this embodiment, the hybrid coupler 140 is a 0°/180° hybrid, the first echo signal $S_{d1}$ and the second echo signal $S_{d2}$ are combined out of phase as the difference signal $S_\Delta$ at a difference output port of the 0°/180° hybrid and combined in phase as the sum signal $S_\Sigma$ at a sum output port of the 0°/180° hybrid. Therefore, the difference signal $S_\Delta$ and the sum signal $S_\Sigma$ also have the Doppler phase shift caused by the movement of the object O.

The difference signal $S_\Delta$ output from the hybrid coupler 140 is injected into the SILO 110 to achieve a SIL state. In the SIL state, the frequency of the SILO is changed according to the Doppler phase shift of the difference signal $S_\Delta$. Thereby, the Doppler phase shift of the difference signal $S_\Delta$ can be acquired through frequency demodulation of the SILO 110. Such a SIL-based detection process provides high sensitivity for extracting small Doppler phase shift caused by physiological movement.

The second power splitter 190 is electrically connected to the first power splitter 180 to receive the other part of the oscillation signal $S_O$ and divides it into two parts. One part of the oscillation signal $S_O$ output from the second power splitter 190 is sent to the first demodulator 150, and the first demodulator 150 frequency-demodulates the oscillation signal $S_O$ into a first demodulated signal. In this embodiment, the first demodulator 150 includes a splitter 151, a delay line 152 and a first quadrature mixer 153. The splitter 151 receives the oscillation signal $S_O$ from the second power splitter 190 and divides the oscillation signal $S_O$ into two parts. These two parts of the oscillation signal $S_O$ are sent to the delay line 152 and the first quadrature mixer 153, respectively. The delay line 152 provides a delay time to the oscillation signal $S_O$ and thus outputs a delayed signal $S_{de}$ to the first quadrature mixer 153. The first quadrature mixer 153 mixes the oscillation signal $S_O$ and the delayed signal $S_{de}$ to output the first demodulated signal including a first in-phase component $I_\Delta(t)$ and a first quadrature component $Q_\Delta(t)$.

The second demodulator 160 is provided to phase-demodulate the sum signal $S_\Sigma$ using the oscillation signal $S_O$ as a reference signal into a second demodulated signal. It includes a phase shifter 161 and a second quadrature mixer 162. The phase shifter 161 is electrically connected to the hybrid coupler 140 via a low-noise amplifier LNA to receive the sum signal $S_\Sigma$ and then outputs a phase-shifted signal $S_{PS}$. The second quadrature mixer 162 is electrically connected to the second power splitter 190 and the phase shifter 161 to receive the other part of the oscillation signal $S_O$ from the second power splitter 190 and the phase-shifted signal $S_{PS}$ from the phase shifter 161. The second quadrature mixer 162 mixes the oscillation signal $S_O$ and the phase phase-shifted signal $S_{PS}$ to output the second demodulated signal including a second in-phase component $I_\Sigma(t)$ and a second quadrature component $Q_\Sigma(t)$.

The processor 170 is electrically connected to the first demodulator 150 and the second demodulator 160 to receive the first and second demodulated signals, and processes them to produce a monopulse ratio signal $S_M$. In this embodiment, the processor 170 performs arctangent demodulation of the first in-phase component $I_\Delta(t)$ and the first quadrature component $Q_\Delta(t)$ of the first demodulated signal to obtain a difference-channel signal, and selects the second in-phase component $I_\Sigma(t)$ or the second quadrature component $Q_\Sigma(t)$ of the second demodulated signal as a sum-channel signal, depending on the path delay between the difference signal $S_\Delta$ and the sum signal $S_\Sigma$. Then, the processor 170 calculates a ratio of the sum-channel signal to the difference-channel signal as the monopulse ratio signal $S_M$ for use in determining an angle $\theta$ of direction towards the object O. Since the difference signal $S_\Delta$ and the sum signal $S_\Sigma$ both have the Doppler phase shift caused by the movement of the object O, the processor 170 can further extract the displacement, speed or frequency of the movement of the object O from the difference-channel signal or the sum-channel signal. In the following examples of this embodiment, the object O is either a metal plate or a human chest that has vibrating and physiological movements, respectively.

Figure 2:
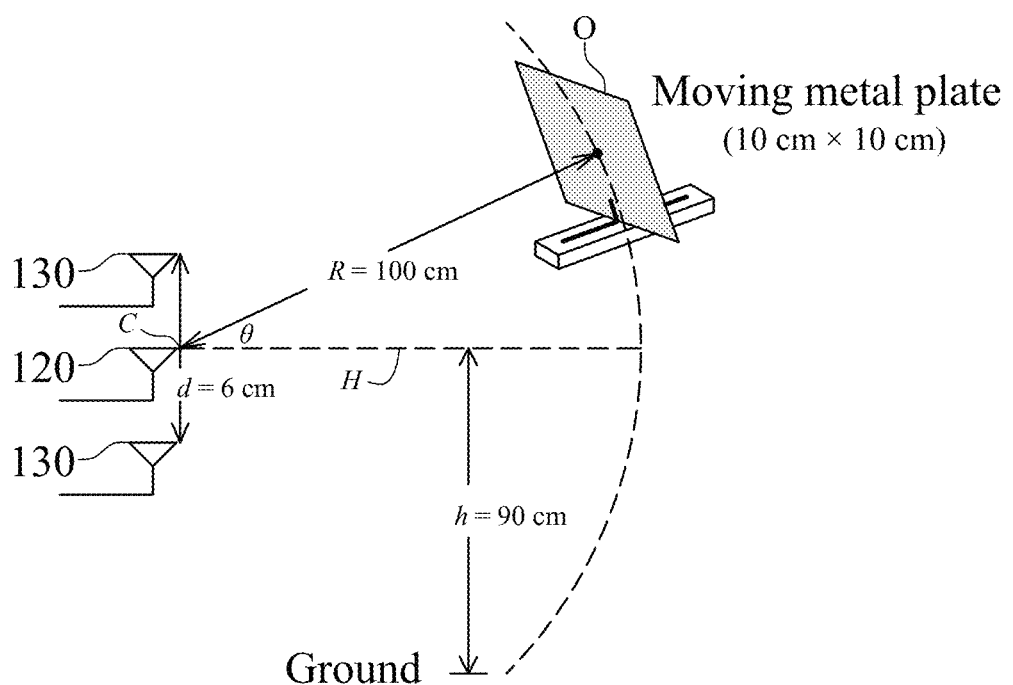
FIG. 2 shows a setup for calibrating a SIL monopulse radar in accordance with one embodiment of the present invention.

With reference to FIGS. 1 and 2, preferably, the phase shifter 161 of the second demodulator 160 provides a phase shift to compensate for the phase difference between the demodulation processes of the difference signal $S_\Delta$ and the sum signal $S_\Sigma$. With this compensation, the monopulse ratio signal $S_M$ calculated by the processor 170 depends only on the angle $\theta$ of direction towards the object O which is defined between a straight line from a midpoint C between the two receive antennas 130 to the object O and a horizontal plane H passing through the midpoint C. While the object O is located above the horizontal plane H (i.e. $0°<\theta<90°$), the monopulse ratio signal $S_M$ is positive and decreases as the angle $\theta$ increases. On the contrary, while the object O is located below the horizontal plane H (i.e. $-90°<\theta<0°$), the monopulse ratio signal $S_M$ is negative and increases as the angle $\theta$ decreases.

Figure 3A:
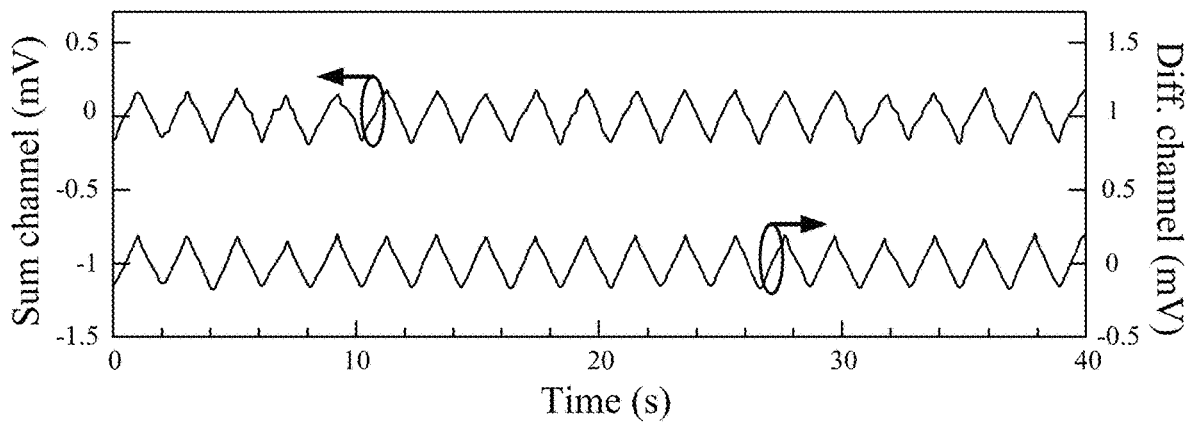
FIGS. 3(a)-(c) are the sum- and difference-channel signals obtained in the experiments of detecting a moving plate placed at an angle of 20°, 0° and −20°, respectively, to the horizontal plane.
Figure 3B:
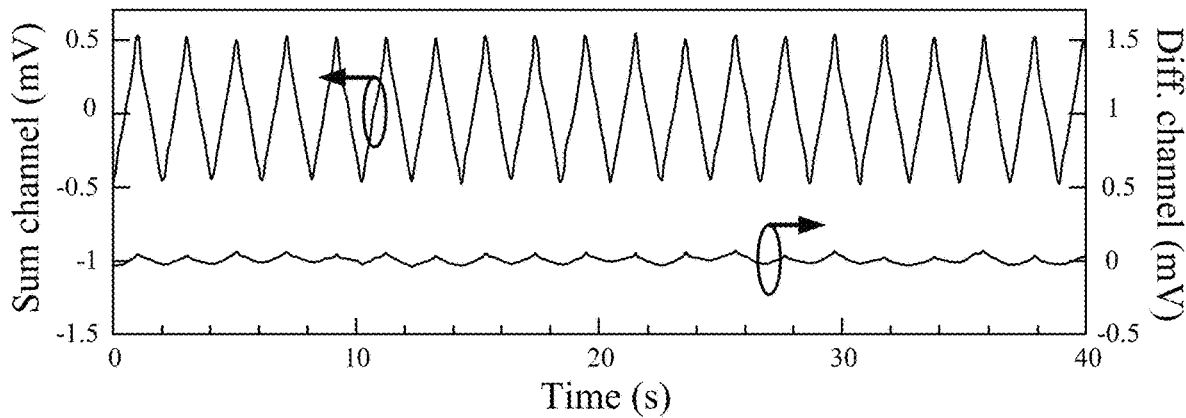
Figure 3C:
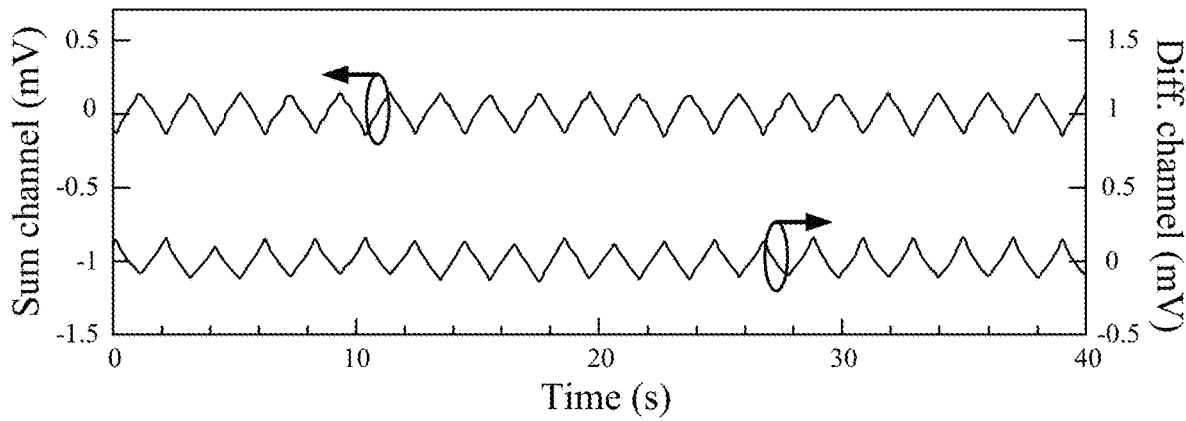

A setup used for calibrating the SIL monopulse radar 100 of this embodiment operating at 2.4 GHz is depicted in FIG. 2. A spacing d between the two receive antennas 130 is set as half-wavelength (about 6 cm) and a height h of the horizontal plane H is set as 90 cm. The object O is a metal plate with an area of 10 cm×10 cm and moves periodically with a displacement of 0.5 cm and a cycle time of 2 seconds. A distance R from the center of the metal plate to the midpoint C is set as 100 cm. The goal of the calibration is to compensate for the amplitude and phase differences between the sum- and difference-channel signals at the angle $\theta$ of 20°. There are two steps in the calibration procedure. Step 1 is to tune the phase shifter 161 to make the sum-channel signal in phase with the difference-channel signal. Step 2 is to multiply the sum-channel signal with a constant factor to make the amplitude of the sum-channel signal equal to that of the difference-channel signal. FIGS. 3(a)-(c) plot the waveforms of the sum- and difference-channel signals at the angle $\theta$ equal to 20°, 0° and −20°, respectively, after the calibration is performed at the angle $\theta$ of 20°. As shown in FIG. 3(a), the sum- and difference-channel signals are in phase and equal in amplitude at the angle $\theta$ of 20°, so the corresponding value of the monopulse ratio signal $S_M$ is exactly equal to 1. FIG. 3(b) shows the sum- and difference-channel signals at the angle $\theta$ of 0° which exhibit the largest and smallest amplitudes, respectively, so the corresponding absolute value of the monopulse ratio signal $S_M$ is much larger than 1. With reference to FIG. 3(c), while at the angle $\theta$ of −20°, the sum- and difference-channel signals are out of phase and almost equal in amplitude, so the corresponding value of the monopulse ratio signal $S_M$ approaches −1. As the experimental results, the monopulse ratio signals $S_M$ calculated by the processor 170 are 1, 15.1 and −1.08 at the angle $\theta$ of 20°, 0° and −20°, respectively, which achieves the goal of the calibration. With the help of this calibration, the SIL monopulse radar 100 of this embodiment can determine the angle $\theta$ of direction towards the object O according to the monopulse ratio signal $S_M$.

Figure 4A:
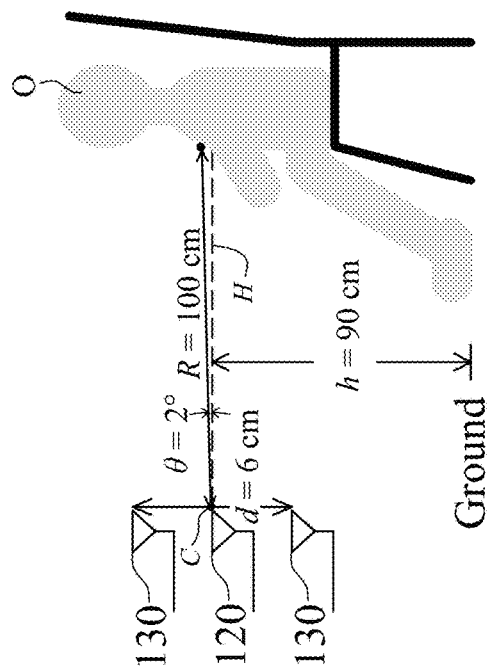
FIGS. 4(a)-(c) show setups of transmit and receive antennas relative to a human body in standing, sitting and lying-down positions, respectively.
Figure 4B:
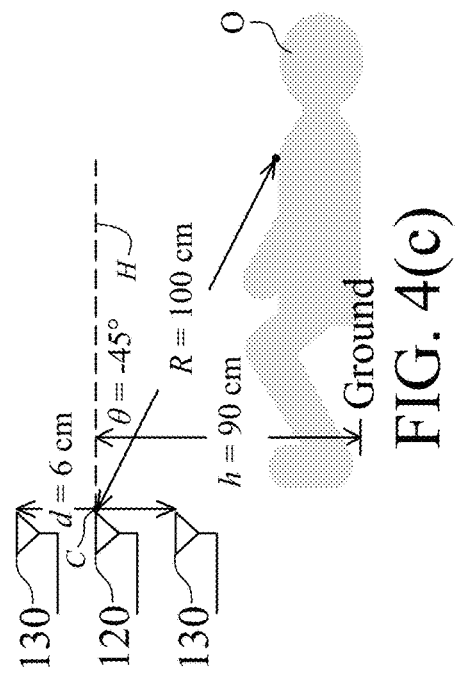
Figure 4C:
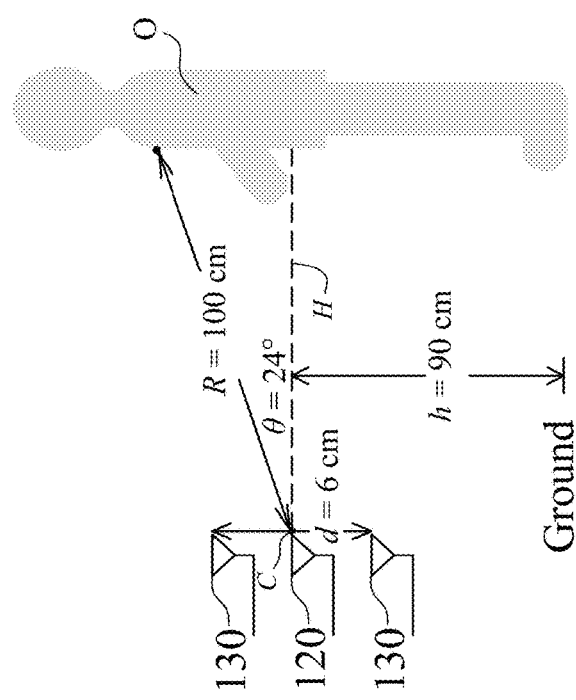
Figure 5A:
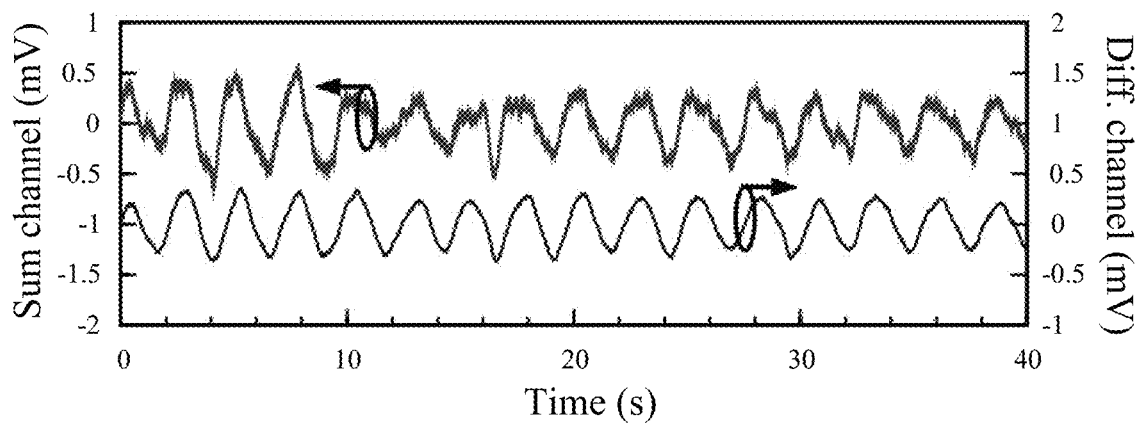
FIGS. 5(a)-(c) are the sum- and difference-channel signals obtained in the experiments with the setups in FIGS. 4(a)-(c).
Figure 5B:
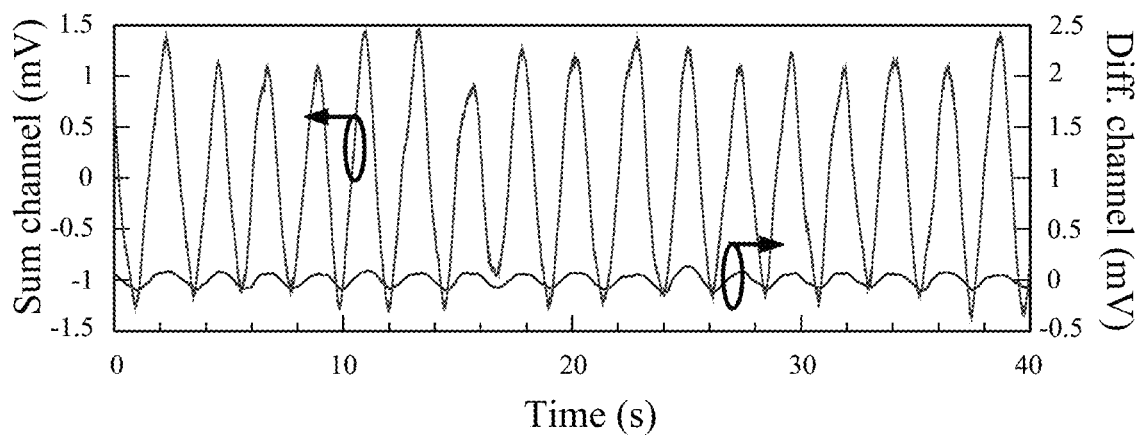
Figure 5C:
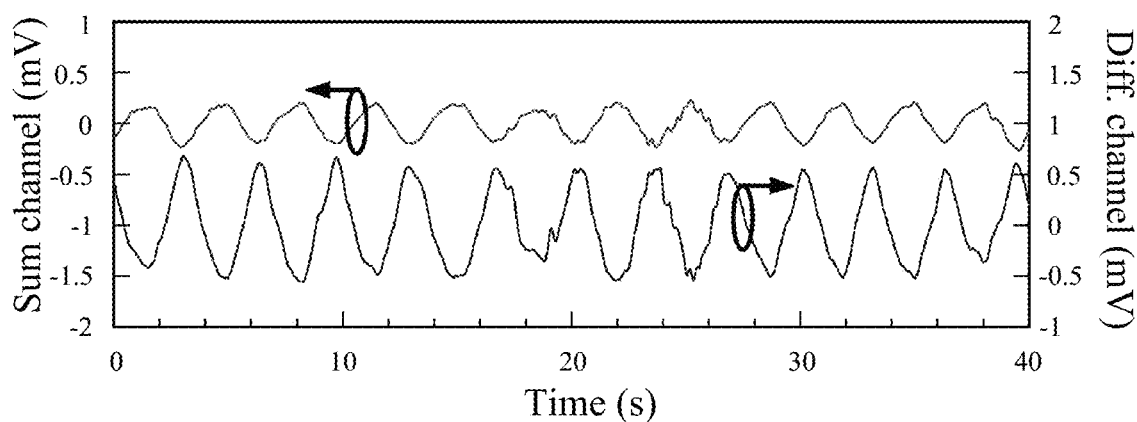
Figure 6A:
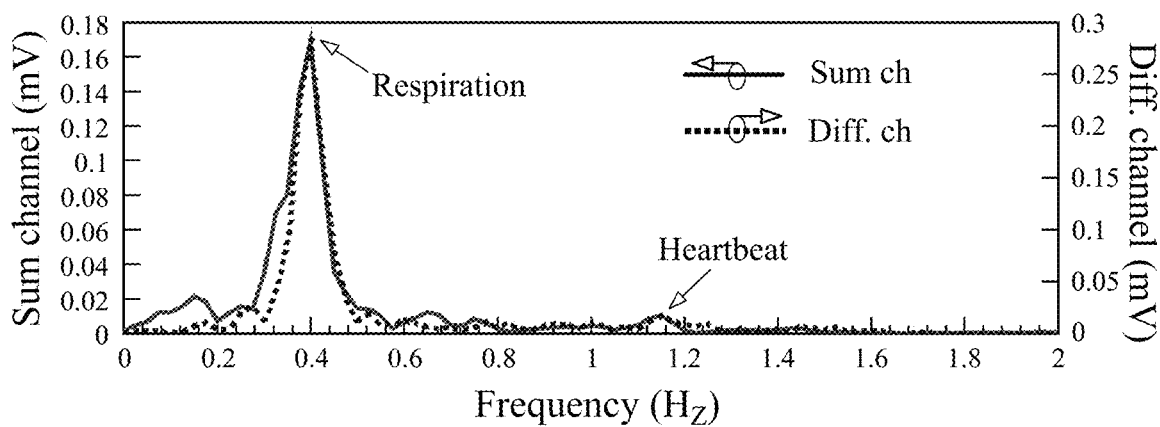
FIGS. 6(a)-(c) show the spectra of the sum- and difference-channel signals in FIGS. 5(a)-(c).
Figure 6B:
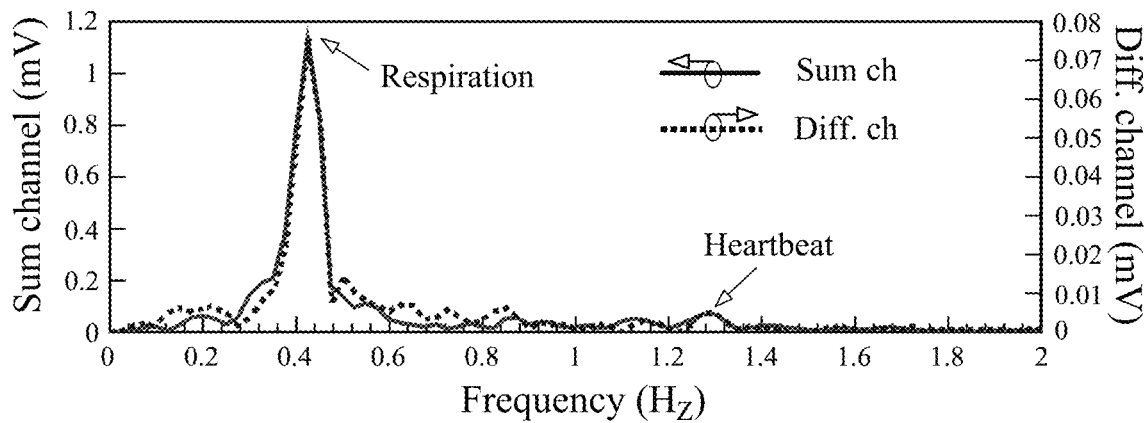
Figure 6C:
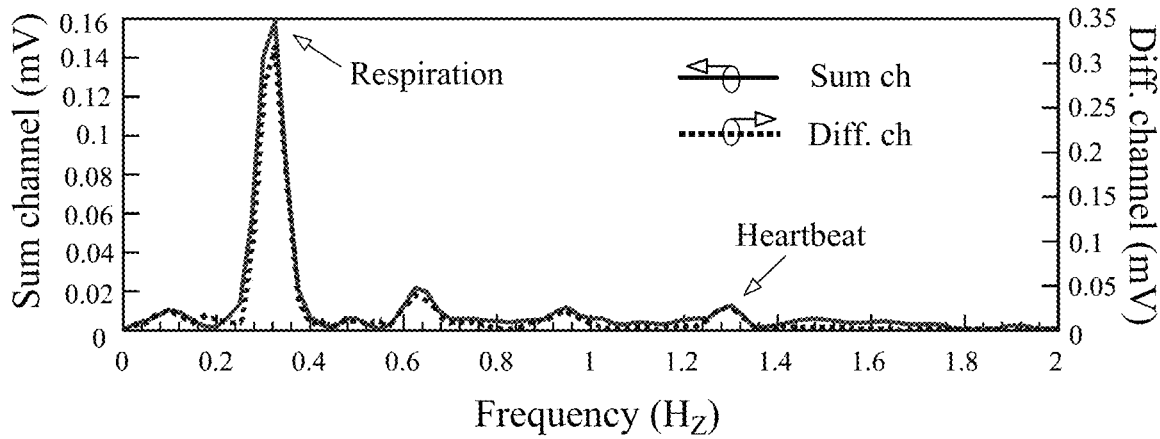
Figure 7:
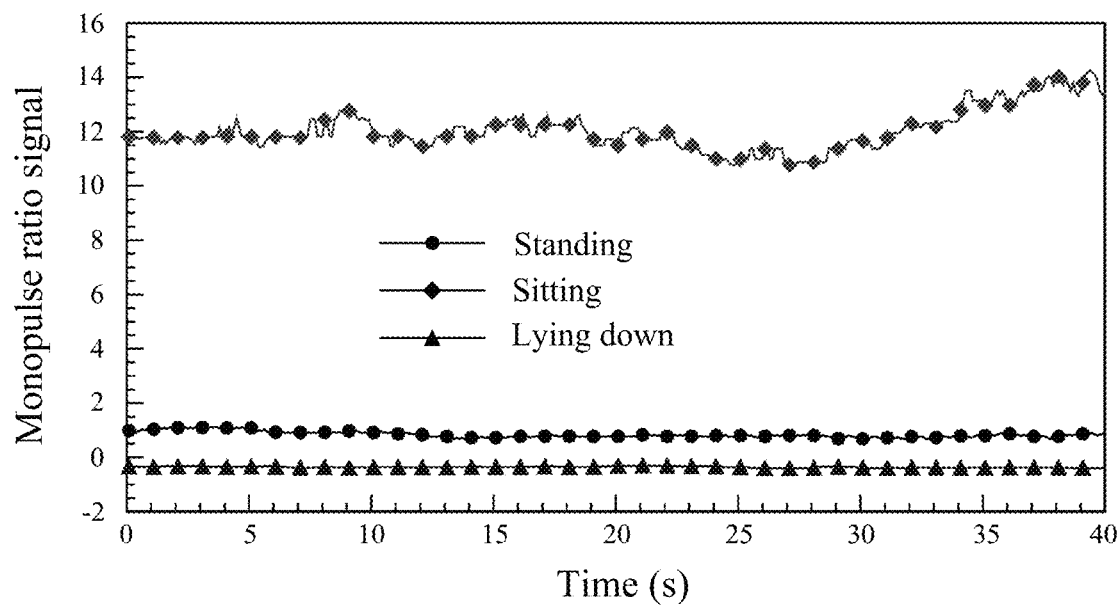
FIG. 7 shows the monopulse ratio signal calculated from the sum- and difference-channel signals in FIGS. 5(a)-(c).

FIGS. 4(a)-(c) show setups of the transmit antenna 120 and the receive antennas 130 relative to a human body in standing, sitting and lying down positions with the same distance R of 100 cm to the center of the chest but at different angles $\theta$ of 24°, 2° and −45°, respectively, towards the center of the chest. FIGS. 5(a)-(c) display the sum- and difference-channel signals obtained in the experiments with the setups in FIGS. 4(a)-(c), and they represent the movement of the chest of the human body due to cardiopulmonary activity such as respiration and heartbeat. FIGS. 6(a)-(c)

show the spectra of the sum- and difference-channel signals in FIGS. 5(a)-(c), where the respiration and heartbeat frequencies are clearly identified. This evidences that the extractions of the Doppler phase shift from the sum signal $S_\Sigma$ and the difference signal $S_\Delta$ both exhibit high sensitivity. FIG. 7 presents the monopulse ratio signals $S_M$ that are calculated by the processor 170 according to the results of FIGS. 5(a)-(c) and have the average values of 0.805, 11.8 and −0.361, respectively. The angles θ estimated from such average values agree with those indicated in FIGS. 4(a)-(c). Apparently, the monopulse ratio signal $S_M$ with the small positive, large positive or negative, and small negative average values is associated with the postures of standing, sitting, and lying down, respectively.

Figure 8:
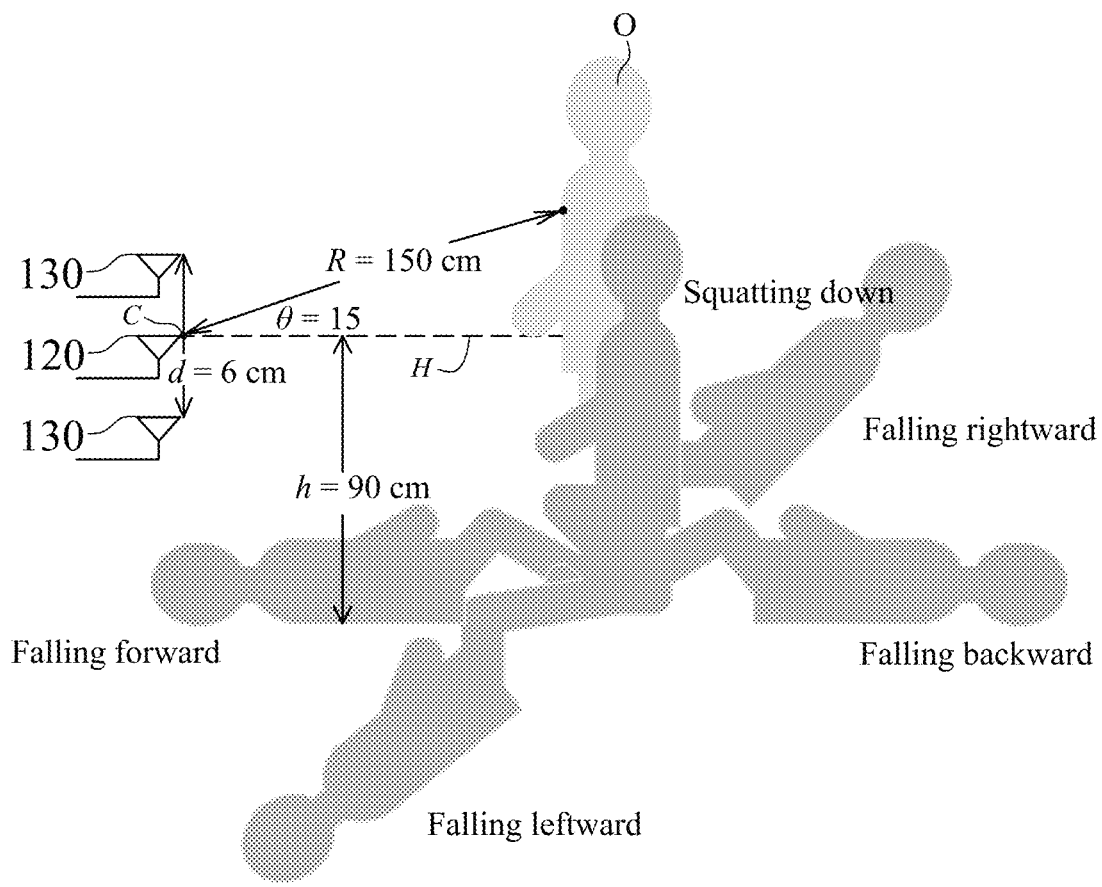
FIG. 8 shows a setup of transmit and receive antennas relative to a human body falling in different directions or squatting down.
Figure 9:
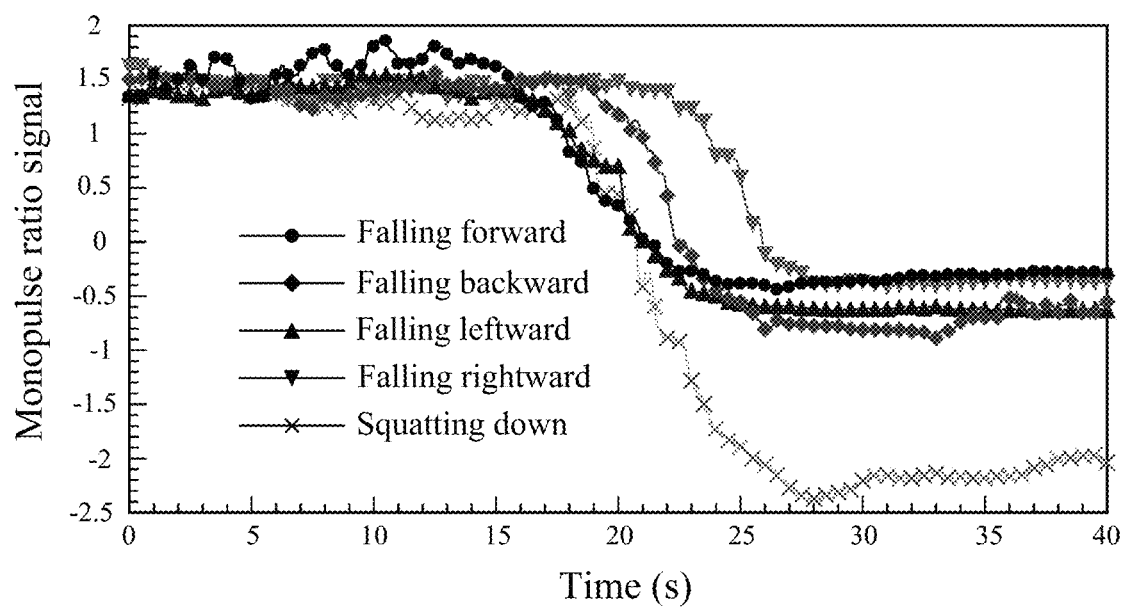
FIG. 9 shows the monopulse ratio signal obtained in the experiments with the setup in FIG. 8.

FIG. 8 depicts an experimental setup to detect the human body falling in different directions or squatting down. FIG. 9 displays the monopulse ratio signal $S_M$ obtains in the experiments with the setup in FIG. 8. Since a falling motion changes the posture from standing to lying-down position, the monopulse ratio signal $S_M$ exhibits a transition from a small positive value to a small negative value as shown in FIG. 9, regardless of the falling directions. However, the transition of the monopulse ratio signal $S_M$ regarding a squatting-down motion ends at a negative larger value because the chest is closer to the horizontal plane H when the human body is in a squatting position. The experimental results demodulate that the SIL monopulse radar of this embodiment can detect various motions such as falling and squatting down by analyzing the monopulse ratio signal $S_M$.

In the present invention, the SILO 110 is injected with the difference signal $S_\Delta$ to achieve a SIL state for an enhanced Doppler sensitivity. Accordingly, the SIL monopulse radar 100 can be used to detect and localize the small movement of the object O by demodulating the difference signal $S_\Delta$ and the sum signal $S_\Sigma$ differently with the first demodulator 150 and the second demodulator 160, respectively, and producing the monopulse ratio signal $S_M$ using the processor 170. If the object O is a human body, the processor 170 can identify the posture and motion of the human body by analyzing the monopulse ratio signal $S_M$.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A self-injection-locking monopulse radar comprising:
 a self-injection-locking oscillator (SILO) configured to generate an oscillation signal;
 a transmit antenna coupled to the SILO and configured to receive and transmit the oscillation signal to an object as a transmitted signal;
 two receive antennas configured to receive a reflected signal reflected from the object as a first echo signal and a second echo signal, respectively;
 a hybrid coupler electrically connected to the two receive antennas and the SILO and configured to receive the first and second echo signals and output a difference signal and a sum signal, the difference signal is configured to be injected into the SILO to achieve a SIL state;
 a first demodulator coupled to the SILO and configured to receive and demodulate the oscillation signal to produce a first demodulated signal;
 a second demodulator coupled to the hybrid coupler and the SILO to receive the sum signal and the oscillation signal and configured to demodulate the sum signal using the oscillation signal as a reference signal to produce a second demodulated signal; and
 a processor electrically connected to the first and second demodulators and configured to receive and process the first and second demodulated signals to produce a monopulse ratio signal,
 wherein the first demodulator is configured to frequency-demodulate the oscillation signal, and the second demodulator is configured to phase-demodulate the sum signal using the oscillation signal as the reference signal.

2. The self-injection-locking monopulse radar in accordance with claim 1, wherein the first demodulator includes a splitter, a delay line and a first quadrature mixer, the splitter is coupled to the SILO to receive the oscillation signal and configured to divide the oscillation signal into two parts and send the two parts of the oscillation signal to the delay line and the first quadrature mixer, respectively, the delay line is configured to delay the oscillation signal and send a delayed signal to the first quadrature mixer, the first quadrature mixer is configured to mix the oscillation signal and the delayed signal and output the first demodulated signal.

3. The self-injection-locking monopulse radar in accordance with claim 1, wherein the second demodulator includes a phase shifter and a second quadrature mixer, the phase shifter is electrically connected to the hybrid coupler and configured to receive the sum signal and output a phase-shifted signal, the second quadrature mixer is configured to receive and mix the oscillation signal and the phase-shifted signal and output the second demodulated signal.

4. The self-injection-locking monopulse radar in accordance with claim 3, wherein the phase shifter is configured to provide a phase shift to compensate for the phase difference between the demodulation processes of the difference signal and the sum signal.

5. The self-injection-locking monopulse radar in accordance with claim 1 further comprising a first power splitter and a second power splitter, wherein the first power splitter is electrically connected to the SILO and configured to receive and divide the oscillation signal into two parts and send the two parts of the oscillation signal to the transmit antenna and the second power splitter, respectively, the second power splitter is configured to divide the oscillation signal into two parts and send the two parts of the oscillation signal to the first and second demodulators, respectively.

6. The self-injection-locking monopulse radar in accordance with claim 1, wherein the first demodulated signal includes a first in-phase component and a first quadrature component and the second demodulated signal includes a second in-phase component and a second quadrature component, the processor is configured to perform arctangent demodulation of the first in-phase component and the first quadrature component of the first demodulated signal to produce a difference-channel signal and configured to select the second in-phase component or the second quadrature component of the second demodulated signal as a sum-channel signal, the monopulse ratio signal is a ratio of the sum-channel signal to the difference-channel signal.

7. The self-injection-locking monopulse radar in accordance with claim 6, wherein the processor is configured to determine the angle of the direction towards the object according to the monopulse ratio signal.

8. The self-injection-locking monopulse radar in accordance with claim 7, wherein while the object is a human body, the processor is configured to identify the posture and motion of the human body by analyzing the monopulse ratio signal.

9. The self-injection-locking monopulse radar in accordance with claim 1, wherein the processor is configured to determine the angle of the direction towards the object according to the monopulse ratio signal.

10. The self-injection-locking monopulse radar in accordance with claim 9, wherein while the object is a human body, the processor is configured to identify the posture and motion of the human body by analyzing the monopulse ratio signal.

11. The self-injection-locking monopulse radar in accordance with claim 6, wherein the processor is configured to process the difference-channel signal or the sum-channel signal to extract the displacement, speed or frequency of the movement of the object.

12. The self-injection-locking monopulse radar in accordance with claim 11, wherein while the object is a human body, the processor is configured to process the difference-channel signal or the sum-channel signal to extract the respiration and heartbeat frequencies of the human body.

* * * * *